O. G. SIMMONS.
ROTARY MILLING CUTTER.
APPLICATION FILED MAR. 13, 1913.

1,126,107.

Patented Jan. 26, 1915.
4 SHEETS—SHEET 1.

WITNESSES
Oliver H. Holmes
Geo. L. Beeler

INVENTOR
Oliver George Simmons
BY
ATTORNEYS

O. G. SIMMONS.
ROTARY MILLING CUTTER.
APPLICATION FILED MAR. 13, 1913.

1,126,107.

Patented Jan. 26, 1915.
4 SHEETS—SHEET 2.

WITNESSES
Oliver W. Holmes
Geo. L. Beeler

INVENTOR
Oliver George Simmons
BY Munn & Co
ATTORNEYS

O. G. SIMMONS.
ROTARY MILLING CUTTER.
APPLICATION FILED MAR. 13, 1913.
1,126,107.
Patented Jan. 26, 1915.
4 SHEETS—SHEET 3.
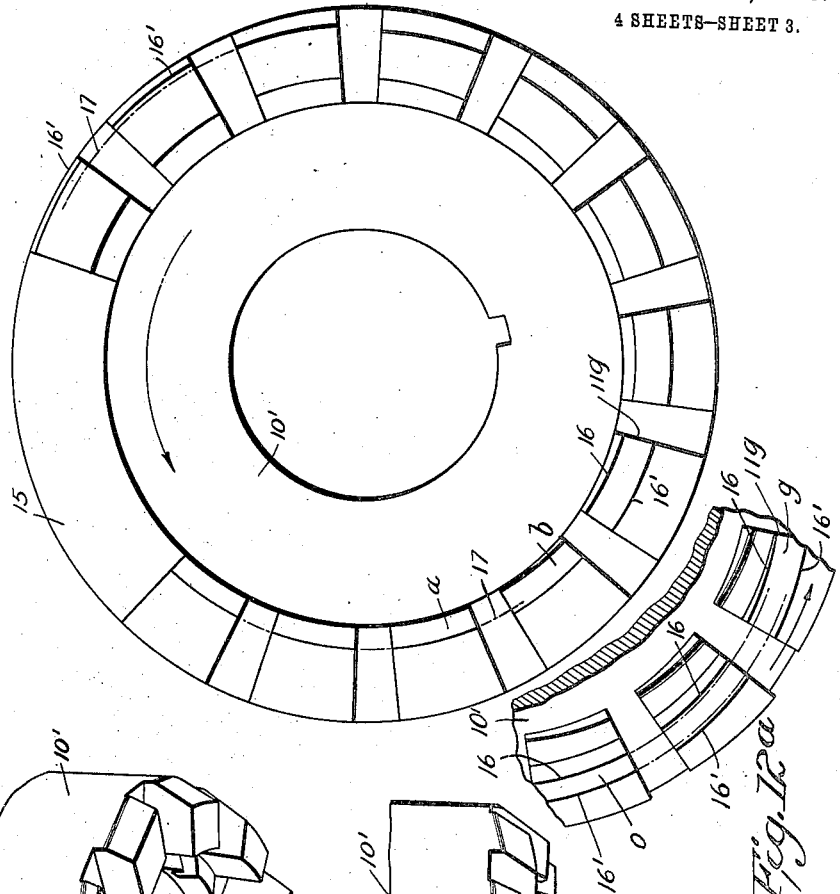
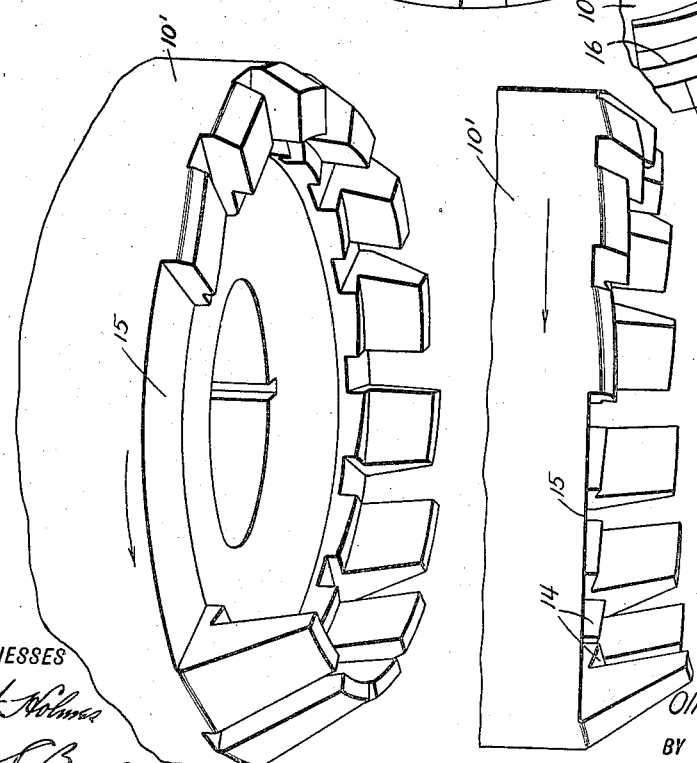
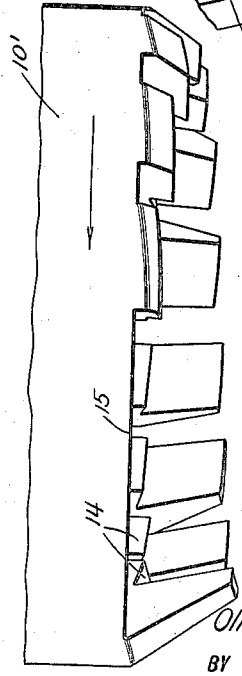
WITNESSES
INVENTOR
Oliver George Simmons
BY
ATTORNEYS

O. G. SIMMONS.
ROTARY MILLING CUTTER.
APPLICATION FILED MAR. 13, 1913.

1,126,107.

Patented Jan. 26, 1915.
4 SHEETS—SHEET 4.

WITNESSES
Oliver W. Holmes
Geo. L. Beeler

INVENTOR
Oliver George Simmons
BY
ATTORNEYS

UNITED STATES PATENT OFFICE.

OLIVER GEORGE SIMMONS, OF NARBERTH, PENNSYLVANIA, ASSIGNOR TO WILLIAM F. FISCHER, OF PHILADELPHIA, PENNSYLVANIA.

ROTARY MILLING-CUTTER.

1,126,107. Specification of Letters Patent. Patented Jan. 26, 1915.

Application filed March 13, 1913. Serial No. 753,977.

*To all whom it may concern:*

Be it known that I, OLIVER GEORGE SIMMONS, a citizen of the United States, and a resident of Narberth, in the county of Montgomery and State of Pennsylvania, have invented a new and Improved Rotary Milling-Cutter, of which the following is a full, clear, and exact description.

This invention relates to metal working machinery, and has particular reference to milling cutters adapted especially for use on rotary spindles, such spindles occupying substantially fixed axes.

Among the objects of this invention is to produce a milling cutter having peculiarly arranged teeth whereby I am enabled to form under-cut grooves in the work.

Figure 1:
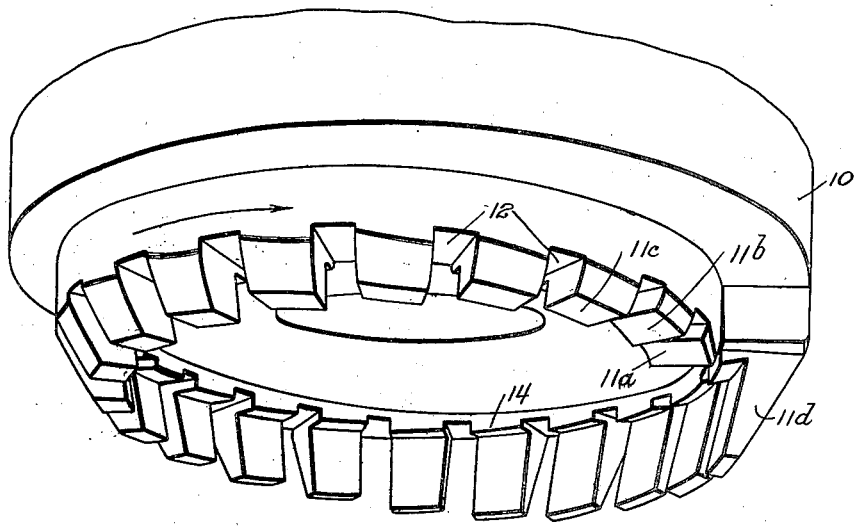
Figure 2:
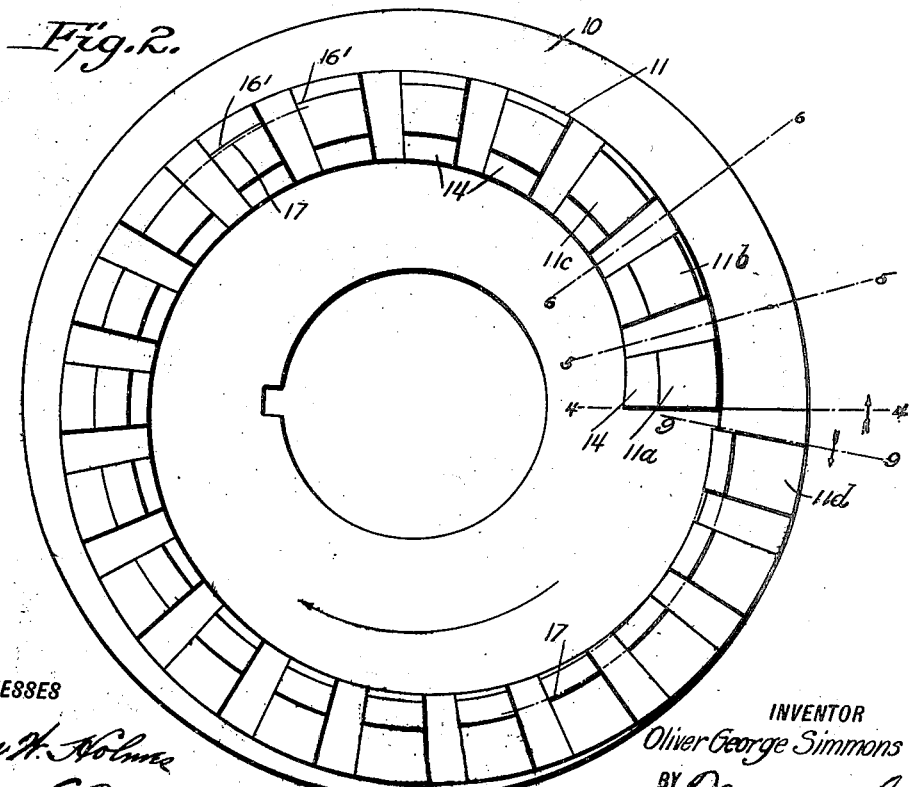
Figure 3:
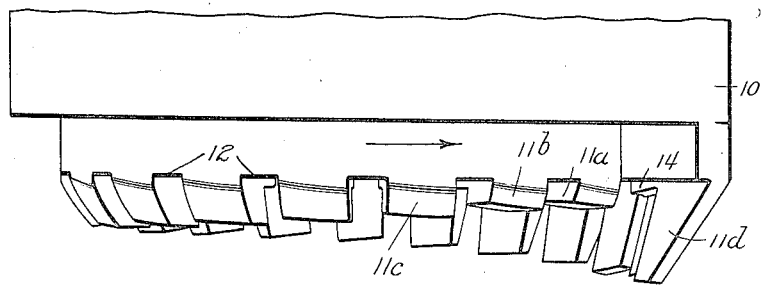
Figure 4:
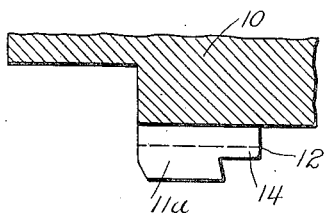
Figure 5:
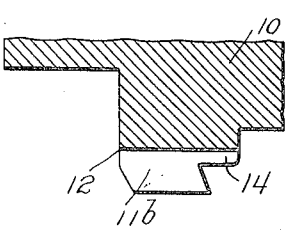
Figure 6:
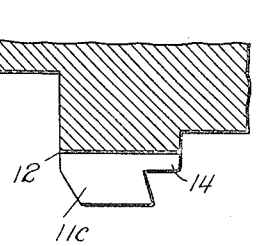
Figure 7:
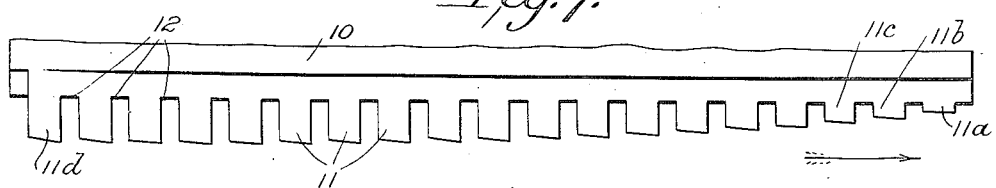
Figure 8:
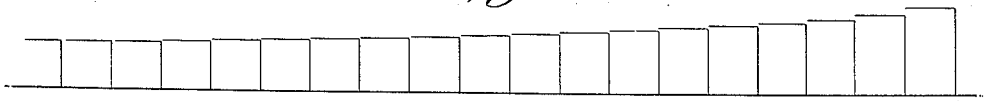
Figure 9:
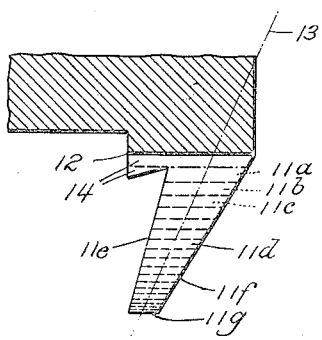
Figure 13:
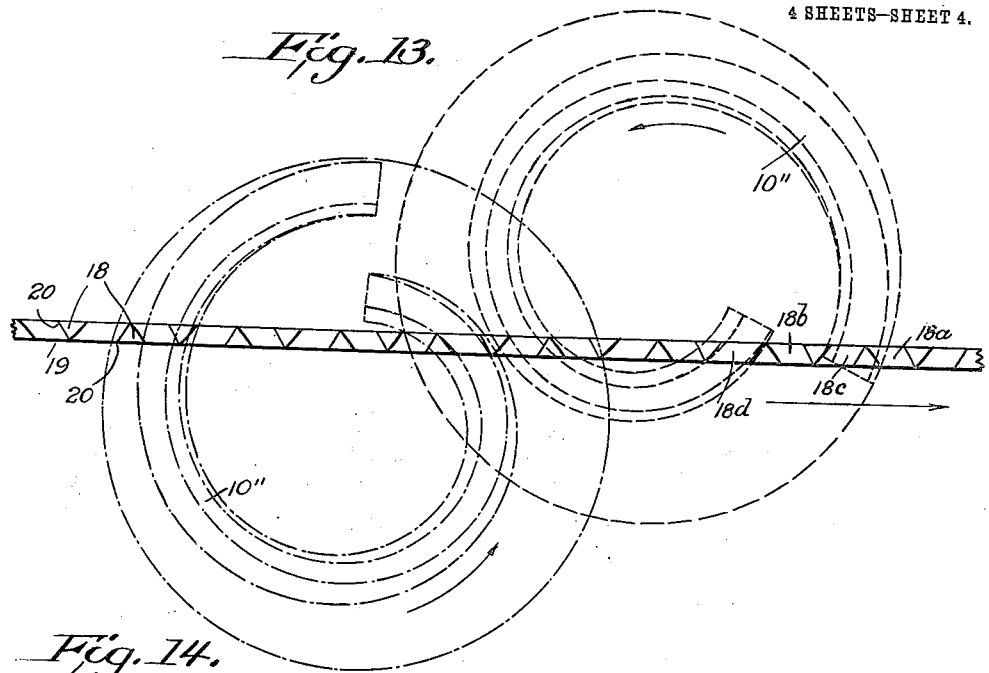
Figure 14:
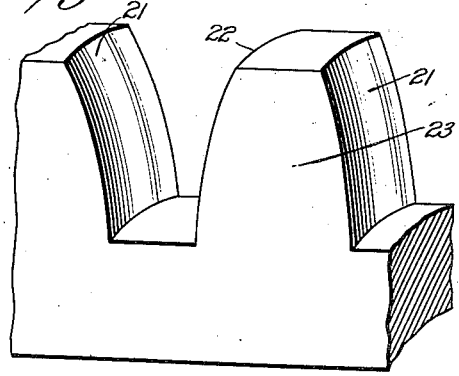
Figure 15:
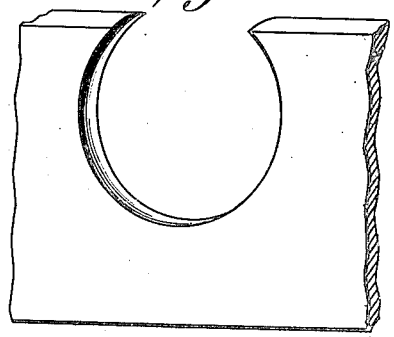
Figure 16:
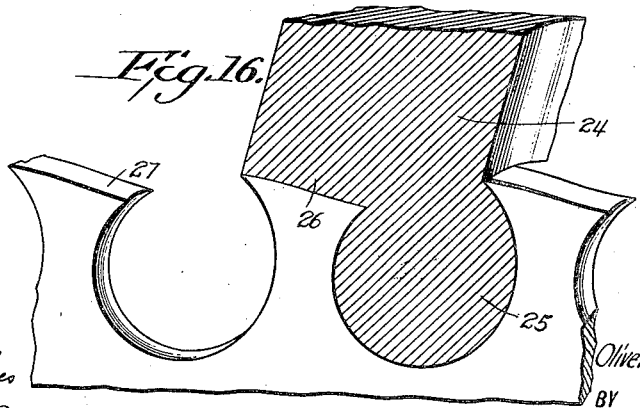

The foregoing and many other objects of the invention are accomplished by means hereinafter more fully described and claimed and illustrated in the accompanying drawings, in which:

Figure 1 is a perspective view of one form of rotary cutter; Fig. 2 is a bottom plan view of the same; Fig. 3 is a side elevation of the same; Figs. 4, 5 and 6 are transverse sections on the corresponding lines of Fig. 2, showing respectively the cutting faces of the first three teeth of the cutter; Fig. 7 is a development of the cutter corresponding to Fig. 3 and indicating diagrammatically the relative depths of the teeth and showing their stepped arrangement; Fig. 8 is a diagram complemental to Fig. 7 and showing the relative variable depths of the cuts of the respective teeth, each to each, viewed in vertical projection from Fig. 7; Fig. 9 is a transverse section on the line 9—9, Fig. 2, showing the contour or outline of the deepest cutting teeth of the series, and showing also in dotted lines the relative depths of the shallower teeth; Fig. 10 is a perspective view of another form of invention, this figure corresponding to Fig. 1; Fig. 11 is a side elevation of the same; Fig. 12 is a bottom plan view of the same, corresponding to Fig. 2; Fig. 12ª is a fragmentary view of the three adjacent teeth of Fig. 12, the view in this figure being taken directly in line with the axes of the teeth; Fig. 13 is a diagram indicating an adaptation of the invention to the making of saw teeth; and Figs. 14, 15 and 16 are fragmentary perspective views of several different forms of teeth which may be cut by various cutters made in accordance with this invention.

Referring more particularly to the first set of figures, I show at 10 a cutter body having a series of teeth 11 arranged on one face thereof, the first cutting teeth of the series being indicated at 11ª, 11ᵇ and 11ᶜ, and the last teeth of the series being indicated at 11ᵈ. The term "series" as hereinafter used may be understood as referring to all of the teeth of a cutter, but where I refer to a number of teeth which may be less than the entire series, I will use the word "plurality."

As indicated in Figs. 4, 5, 6, 7 and 9, the bases or roots of the teeth all lie in the same plane, represented at 12, and said bases are all of the same breadth or length radially of the cutter, the essential difference between adjacent teeth being that in depth or altitude with respect to said base plane 12. The plane defined by said tooth base is shown as being perpendicular to the axis or center of rotation of the cutter and the teeth project therefrom in any suitable direction. As shown in Fig. 9, the dotted and dash line 13 indicates the axis or median line of the teeth, such line being inclined at an oblique angle to the axis and preferably so arranged as to intersect the axis when projected from the base through the apexes or points of the teeth.

The teeth may be arranged in a plane, as shown, and in any suitable geometric curve, such as in the arc of a circle or in a spiral. The pitch of the spiral may be either single or multiple and the extent of the curve may be varied with respect to the distance around the axis. In the first set of figures the teeth are arranged in a spiral, the bases lying in said plane defining a true flat spiral, or one in which the radii are different but in which there is no displacement longitudinally of the axis. In order for the bases of the teeth in this form of device to follow one another in precisely the same path through or along the work, there is caused, by any suitable mechanism, a relative movement of the work in the direction of the radius of the cutter during the rotation of the cutter. That is to say, considering the tooth 11ª as beginning the cut at a certain radius, the work will be caused to be moved outwardly from the axis through a distance represented by the pitch of the spiral while the cutter makes one rotation.

Not only is the axis 13 of each tooth inclined to the axis of the cutter, but the sides of the cutting face or outline of each tooth extending from the base thereof may be inclined or under cut in any desired shape. The tooth shown in Fig. 9 is one in which the outline comprises two sides, $11^e$ and $11^f$, both of which are inclined to the axis of the cutter and whereby an under-cut effect of the device is produced. The apex or point, the part remote from the base of each tooth, may be of any shape, but in this form is shown as a line $11^g$. In order to increase the efficiency of the cutter, I provide that most of the teeth of the series have variably different depths, the greatest difference in depth between adjacent teeth being found with respect to the shallower teeth. In this way the first cutting teeth, being stronger than the last teeth of the series, have put upon them more work than the last teeth.

By referring to Figs. 7, 8 and 9 it will be apparent that the several teeth differ in depth by a variable increment, the curve representing such variation having a shorter radius with respect to the first cutting teeth, and finally is drawn out into a straight line with respect to the last teeth of the series, the last three or four teeth being of the same depth, whereby the life of the cutter is increased because the last cutting tooth is reinforced by those few that follow directly after it completing the series. The last few teeth, therefore, insure a perfect finish to the work and provide a means to cut tools such as saws, files or the like, making perfectly smooth, keen, sharp-cut edges, which will require no further sharpening treatment. For this reason I can produce a superior grade of cutting tools at an exceedingly low cost.

While the bases of the teeth are shown as lying in a plane, the apexes or points thereof, as shown in Fig. 3, describe what I will term as a spiral helix or as a curve which is helical with respect to displacement longitudinally of the axis, as shown in Fig. 3, but which is spiral with respect to the radii, as shown in Fig. 2.

Each tooth of the series is preferably provided with a projection 14 which, like the corresponding teeth, increases in depth or altitude substantially in proportion to the increase in depth of the main teeth, beginning with the first teeth of the series. Such projection may be termed a roughing cut projection, which, with respect to the first cutting teeth, serves to remove any irregularities which may exist in the blank being worked upon and through the operation of which the job will be turned out absolutely true. The roughing cutter extensions of the last teeth of the series, however, as shown in Fig. 9, serve as a means to finish a certain portion of the tool or device being cut.

It will be understood that in the practical operation of this cutter upon a straight blank, the axis of the cutter will be slightly inclined to the plane or face of the blank, so that a portion only of the series of teeth will be in engagement with the work.

In Figs. 10, 11 and 12 I show a stepped-tooth rotary cutter, the bases of the teeth not only being in a plane, as before, but arranged in a circle in said plane. The series of teeth in this modification are shown provided with a gap 15 of any suitable width or circumferential extent allowing for a sufficient interval between the operation of the last tooth of the series and the beginning of the next cut by the first tooth to enable the blank to be moved a distance equal to the pitch of the spiral above described. In other words, by rotating this cutter $10'$ continually around a fixed axis, even though the bases of the teeth are arranged in a circle, I can cut a succession of tool teeth by giving the blank a step-by-step feed, and, at the same time, I can produce under-cut teeth of any desired form or inclination. The teeth of this cutter in Figs. 10, 11 and 12 are, or may be, substantially the same in form as those of the first set of figures, but since the axes of the teeth are inclined, corresponding to the line 13 of Fig. 9, the apexes or points of the teeth describe a spiral helix of somewhat the same character as that above explained. Fig. 12 indicates, though in the same exaggerated form, the variation in radial width of adjacent teeth and how each tooth has an offset relation to the adjacent tooth with respect to its cutting line or point $11^g$. The face $g'$, of which the cutting edge $11^g$ constitutes the front edge, is bounded by inner and outer parallel curves 16 and $16'$; and the corresponding face of the next tooth is so formed as to have its parallel curved edges both closer to the median line of the tooth, and which lines if extended would intersect or engage the preceding tooth within both of the first-mentioned lines 16 and $16'$. In the plan views of Figs. 2 and 12, the lines 16 just referred to appear to describe a true spiral but this is because of the increase in depth of the succeeding teeth added to the inward inclination thereof. The dot-and-dash curved lines 17 of Figs. 2 and 12 indicate the fact that the curvature of each tooth around the axis of the cutter when projected intersects the preceding teeth to a considerable extent within the bounding line $16'$ thereof.

Fig. 13 shows in dotted lines a stepped-tooth milling cutter $10''$, the teeth thereof being arranged in a spiral of double pitch and adapted for the cutting of teeth 18 in the edge of a saw blank 19. By operation of this cutter within the spirit of this invention I first make a cut 18ª, and by the time this cut is finished the second cut 18ᵇ is begun, and so on through the first half of the operation; said cuts being of double pitch enables me to change the position of the cutter with its axis on the opposite side of the blank 19, and then form a second series of cuts 18ᶜ, 18ᵈ, etc., leaving teeth 18 on the saw having edges 20 which are not only at acute angles to the plane of the saw but are also hollow cut, due to the curvature of the cutter. A saw made in this way requires no filing and is of a very sharp, keen quality.

Figs. 14, 15 and 16 show various forms of teeth which may be made with rotary cutters embodying the broad principles of this invention. Fig. 14 may be regarded as a fragment of a rack adapted for use in connection with a spiral gear. Opposing faces 21 and 22 of the teeth 23 are respectively concave and convex and the cuts forming the spaces between the teeth are made by the successive operation of a series of stepped teeth the bases of which follow one another at the widest place between the points of the teeth 21.

Figs. 15 and 16 show rounded under-cut teeth of various forms; and Fig. 16 shows, also, a form of cutter 24 having a main tooth 25, which is the last cutting tooth of the series, and an extension thereof 26, which forms the finish for the top of the saw tooth 27 formed thereby.

With reference to the cutting or leading face of each cutter tooth, it will be noted that by the use of an ordinary cutter grinder applied to such face between it and the next preceding tooth, said cutter tooth may easily be kept sharp, and by reason of the clearance provided leading back from the cutting edges (shown in Fig. 9 as 11ᵉ, 11ᶠ, and 11ᴳ) the form of each tooth remains unchanged even when ground away to the maximum extent. Furthermore, by grinding all of the teeth in succession the relative forms of all of the teeth may remain the same as the teeth of a new cutter. The lines 16 and 16' of each tooth, also, remain parallel through the length (circumferentially) of the tooth, by reason of the above-stated clearance.

Having thus described my invention, I claim as new and desire to secure by Letters Patent:

In a rotary milling cutter, the combination of a plurality of cutting teeth arranged in a curve around the axis of the cutter, said teeth being of varying depths and each provided with a radially projecting auxiliary roughing cutter, the roughing cutters of the several teeth also being of varying depths.

In testimony whereof I have signed my name to this specification in the presence of two subscribing witnesses.

OLIVER GEORGE SIMMONS.

Witnesses:
GEORGE L. BEELER,
PHILIP D. ROLLHAUS.